United States Patent [19]

Wiech, Jr.

[11] 4,305,756

[45] Dec. 15, 1981

[54] METHOD AND MEANS FOR REMOVING BINDER FROM A GREEN BODY

[75] Inventor: Raymond E. Wiech, Jr., San Diego, Calif.

[73] Assignee: Witec Cayman Patents, Ltd., Cayman Islands

[21] Appl. No.: 111,633

[22] Filed: Jan. 14, 1980

[51] Int. Cl.³ .............................................. B22F 3/00
[52] U.S. Cl. ...................................................... 75/211
[58] Field of Search .................. 75/211, 200; 428/548; 266/252, 148

[56] References Cited

U.S. PATENT DOCUMENTS

| | | | |
|---|---|---|---|
| 3,796,565 | 3/1974 | Hancock et al. | 75/211 |
| 4,002,473 | 1/1977 | Klein | 75/211 |
| 4,113,480 | 9/1978 | Rivers | 75/211 |
| 4,225,345 | 9/1980 | Adee et al. | 75/211 |

Primary Examiner—Brooks H. Hunt
Attorney, Agent, or Firm—Jay M. Cantor

[57] ABSTRACT

The disclosure relates to a method of binder removal from a green body before sintering or the like wherein the green body is placed in a pressure chamber wherein the pressure is raised to a level above the vapor pressure of the binder in the green body at the ambient temperature within the pressure chamber. Where several binders are utilized simultaneously, the pressure within the chamber is maintained higher than the vapor pressure of the lowest of the binders then in the green body at the temperature within the green body. Under these conditions, the binder or binders will turn to a vapor, will follow the normal laws of evaporation and diffusion and diffuse out from the green body into the surrounding environment within the chamber. The binder can subsequently be removed from the chamber in conventional manner.

37 Claims, 1 Drawing Figure

METHOD AND MEANS FOR REMOVING BINDER FROM A GREEN BODY

BACKGROUND OF THE INVENTION

The art of forming shaped articles from particulate materials is well known in the art. Classically, a desired particulate material is mixed with a binder and then formed into the desired shape, this being called the green body. The green body is then sintered to provide a fusion of the particulate material and to drive off the binder, thereby producing the desired shaped product with desired surface textures, strength, etc.

In the production of shaped objects in the manner above described, it has been found that it is necessary to remove the binder before the green body can be sintered to avoid cracking. This is a very difficult task, however the prior art has recognized this problem and has therefore attempted to remove binder from the shaped green body prior to the step of firing. Examples of such prior art are set forth in the patent of Strivens U.S. Pat. No. 2,939,199 and British Pat. Nos. 779,242 and 1,516,079. Unusual conditions such as vacuum or solvent atmospheres are required by the prior art and cracking of parts due to process irregularities remains a problem. In addition, prior art solvent extraction techniques present health hazards which are difficult and expensive to eliminate. Solvent recovery and recycling by prior art methods is costly and adds a substantial overhead burden to the process. Bubbling and cracking of the green body during binder removal are present in the prior art binder extraction systems. Both bubbling and cracking are due to the internal pressure forces that are generated by the conversion of the binder from a solid or liquid phase to a vapor phase and the subsequent expansion of the vapor bubble. The conditions under which the vapor bubble expands can be either isothermal or isotropic (adiabatic) though isothermal is usually the primary way. It appears that the reason for some of this bubbling caused in the prior art binder removal system is due to the fact that the true boiling points of liquids are dependent not only on the properties of the liquids themselves but also upon the geometry and the interfacial surface enegery between the particulate material and the binder.

The original process—The Bendix Process—is about 30-40 years old. It is produced by Dimonite Corporation and employed a plural component thermoplastic binder, paraffin, beeswax and polyethylene. The injection molded part is baked out (LTB'D) for long periods of time, sometimes running into many days, to remove the binder. Hastening the burnout schedule results in cracking, blistering, etc. The Wiech Criteria is met here by very slowly advancing temperature to allow all volatiles to evaporate without causing internal Pv energy release by vapor expansion.

Strivens recognized the limitation of the Bendix process and met the Wiech Criteria simply by increasing the cohesive work/energy of the particulate system by incorporating a high strength thermoset plastic into the system. In this way he could advance temperatures much faster than the Bendix process. Later he recognized solvent extraction and met the Wiech Criteria by multiple thermoplastics.

Next, Wiech met the Wiech Criteria by a technique that minimized the expansive work/energy by insuring that the binder was liquid and can not support sheer stress.

In reviewing these processes it has become apparent that:

(1) The preferred industrial process is one that is most amenable to continuous (vs. batch) production and (2) Maximizes the binder removal rate within the requirements of the Wiech Criteria.

Before proceeding a generalized statement of the Wiech Criteria is:

(1) Wiech Criteria: $(\Delta pv)_{cohesive} > (\Delta pv)_{disruptive}$

The cohesive work/energy of the particulate system must be greater than the disruptive work/energy of the binder removal processes.

The thermodynamic processes involving vapors or gases are the ones that have the greatest pv terms. Practical engines are based upon vapor/gas expansion and compression rather than solid or liquid expansion and compression. For this reason, primarily, the generation of vapors and gases internal to the molded part lead to the high $(\Delta pv)$ disruptive term which causes failure of the part.

The key to the successful removal without destructive disruption of a binder from a particulate based body is to provide such removal in such a way that the internal work/energy of the escaping binder is insufficient to overcome the cohesive work/energy of the particulate material. These conditions are met in the process disclosed in the British Pat. No. 1,516,079 wherein the binder is heated to a liquid state and the binder is removed while in the liquid state slowly enough to stay within the required work/energy envelope. However, relatively long extraction times and a complex series of extraction steps is the price that one pays for meeting the successful extraction criteria.

A truly successful industrial method is one that can operate on a continuous basis from the formation of the green body through the sintering process. This has not been done in the prior art.

BRIEF DESCRIPTION OF THE INVENTION

At any temperature above absolute zero, every pure substance exerts a pressure of vapor, called the vapor pressure, which is a characteristic of the substance. This pressure of vapor in equilibrium with the substance has, at constant temperature, a definite value which is in contrast to the pressure of vapor in the absence of the substance, which may have any value of pressure up to that of the saturated vapor pressure of the substance. The vapor pressure of soilds and liquids increases rapidly with the temperature. Variations of the vapor pressure with temperature are expressed quantitatively by the Clapeyron equation:

$$dp/dT = L_v/T\Delta v$$

Where:
P is the vapor pressure
T is the absolute temperature
$L_v$ is the molar heat of vaporization (liquid) or sublimation (solid)
$\Delta v$ is the volume of 1 mole of vapor minus that of 1 mole of the solid or liquid at this temperature.

Based upon the assumptions that the molar volume of the solid or liquid substance is negligible compared to that of the vapor and the vapor is an ideal gas, the more useful approximate Clausius—Clapeyron equation is derived:

$$d(\ln p)/(dT) = L_v/RT^2$$

The temperature at which the vapor pressure of a liquid substance is equal to a standard external pressure of 760 m.m.Hg. is called the normal boiling point of the substance. As a liquid cannot support a sheer stress, ebulition can take place throughout the volume of a liquid as opposed to evaporation which takes place at the surface only. Solid substances can support sheer stresses, hence sublimation is normally not an interior phenomenon. For a liquid in general, that temperature at which the vapor pressure of the liquid equals the total external pressure is the boiling point of the liquid and when the vapor pressure exceeds this external pressure by an infinitesimal amount, the liquid boils. If the external pressure is greater than the critical pressure, then the substance can never boil or internally sublimate.

If the external pressure is greater than the critical pressure, then, theoretically, the temperature of a molded part can be advanced as rapidly as is consistant with not warping the part due to sintering problems. Simply stated, the binder extraction process can be reduced from days to minutes.

Briefly, in accordance with the present invention, a green body will be formed in accordance with the procedure set forth in the prior art as evidenced from the above mentioned patents. The green body will then be placed in a pressure chamber wherein the pressure within the chamber will be raised to a point above the vapor pressure of the binder at the temperature within the chamber of ambient temperature. It should be understood that, in the event more than one binder is used, the pressure within the chamber will be above the vapor pressure at which the binder mixture will boil at the temperature within the chamber.

Briefly, in accordance with one embodiment of the invention, a green body is placed within a pressure chamber in a controlled atmosphere wherein the heat and pressure are controlled so that the pressure within the chamber is above the vapor pressure of the binder as above described at the temperature within the chamber. A portion of the chamber is isolated from the heated portion thereof and this isolated portion of the chamber will include a cooling or cooled area wherein binder will condense out of the atmosphere. This binder can be collected and recycled. As binder is removed from the atmosphere, other binder will flow from the green body into the atmosphere by evaporation up to the point of saturation of the atmosphere. In practice, the atmosphere will be unlikely to become saturated due to the removal of the binder in the cooling area. The rate of removal of binder from the green body can be controlled by controlling the cooling rate within the cooled area of the chamber or by controlling the rate at which binder vapor can flow in the atmosphere from the green body to the cooled portion of the chamber. This can be accomplished by placing a valve in a pipe which joins the heated portion of the pressure chamber and the cooled portion of the pressure chamber. When the binder has been removed from the green body, the green body is cooled and then removed from the pressure chamber whereupon sintering techniques as disclosed in the above described prior art patents will be applied to provide the completed article.

In order to provide a continuous system, after the green body binder has been completely removed, the controlled gases which have been previously within the chamber are removed and the heated portion of the chamber is closed off from the cooling portion of the chamber. The chamber is then heated to sintering temperatures as in the prior art wherein the binderless green body is sintered in accordance with the prior art techniques in an appropriate atmosphere as disclosed in the above mentioned prior art patents. In this way, the binder removal and sintering techniques can be performed on a continuous basis.

BRIEF DESCRIPTION OF THE DRAWING

The drawing represents a schematic embodiment of a system for carrying out the method in accordance with the present invention.

DETAILED DESCRIPTION OF THE INVENTION

Figure 1:
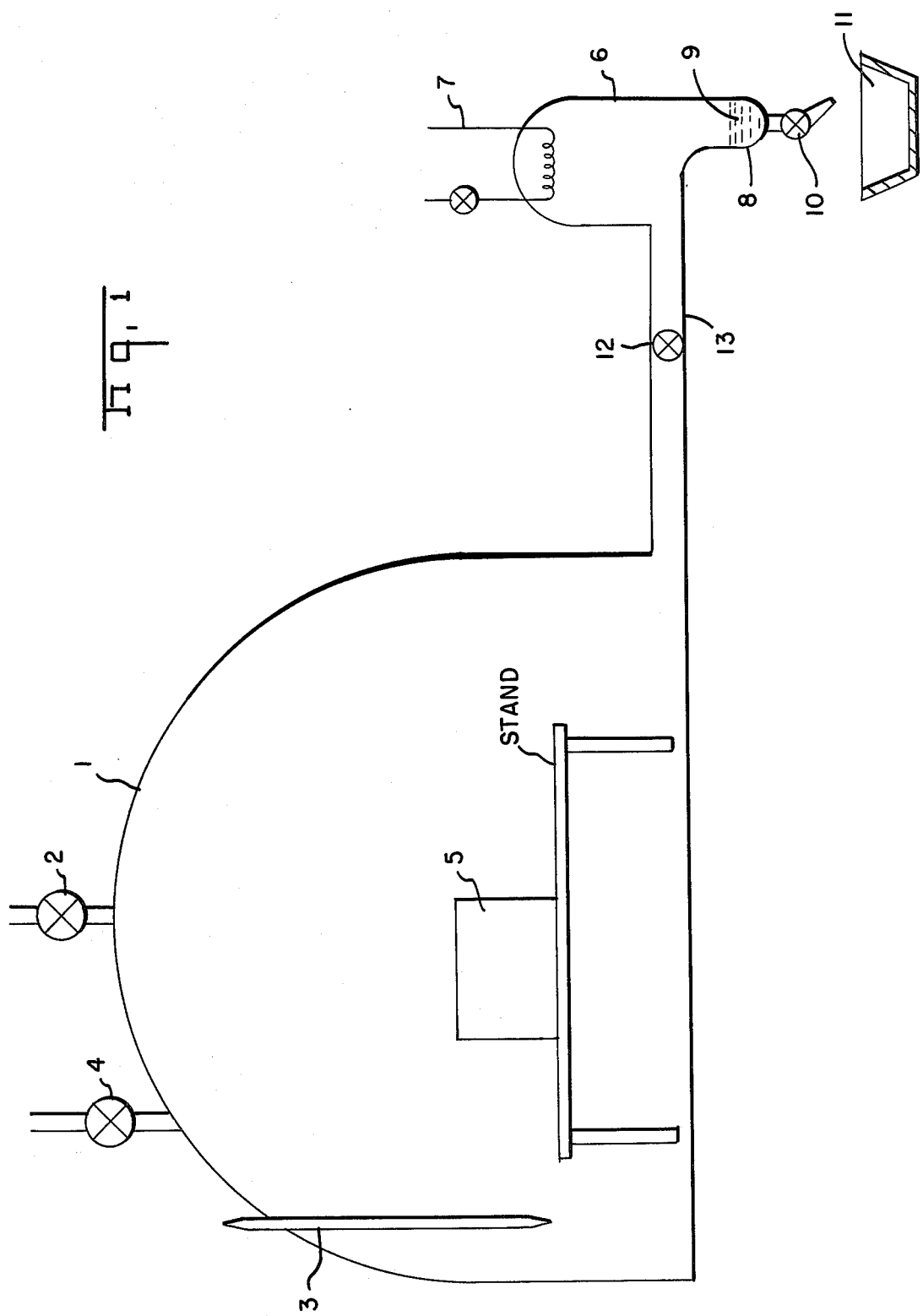

Referring now to the FIGURE, a green body, which is formed from particulate material and binder in accordance with prior art methods as described in the above mentioned patents, is placed in a pressure chamber 1 which is filled with an inert gas such as argon, helium, nitrogen or the like via valve 2. It should be understood that the term inert refers to an atmosphere which is inert relative to the materials embodied in the green body. The chamber 1 is heated to a predetermined temperature by means of the heater 3 and to a predetermined pressure by means of pressure regulator 4. The pressure within the chamber is designed to be above the vapor pressure of the binder in the green body 5 at the temperature within the pressure chamber 1. The term pressure relates to the total pressure within the chamber which is represented by the sum of all the partial pressures of the vapors and gases in the chamber 1. At the temperatures and pressures within the chamber 1, the binder within the green body 5 will have a pressure of vapor above zero or of finite value which causes the binder within the green body to leave the green body in a vapor phase up to the point where the external pressure of vapor (that in the chamber) is the same as the pressure of vapor within the green body (that of the binder). At this point there would be a dynamic equilibrium between the external (in the chamber) and internal (green body) binder vapor pressure. However, at this point of saturation, the net further removal of binder from the green body into the chamber will be zero.

It is therefore necessary, that the chamber atmosphere continually have binder vapor removed therefrom so that binder from the green body can continually move from the green body into the atmosphere in other than an equilibrium state. This is accomplished by providing a portion of the of the pressure chamber which is in a cooled state. Accordingly, there is provided the chamber portion 6 having cooling coils 7 therein wherein binder in the atmosphere is condensed into the condensate collecting region 8, the condensed binder being shown at 9. As this binder is removed from the atmosphere, other binder from the green body 5 can replace it within the atmosphere. The rate of removal of binder from the green body is dependent upon the temperature in the chamber 6 caused by the cooling coils 7. It is necessary that this removal rate not be too great so that internal pressure gradients can be formed in the green body which would tend to cause cracking or rupture as in the prior art systems. In most cases this would not be a concern though it could be a concern in certain isolated situations. As can be seen from the FIGURE, the condensate can be removed on line or at the end of a cycle by opening of the pet cock 10 wherein the binder, which is in liquid state or which is maintained in a liquid state, flows through the pet cock into the container 11.

An alternate form of binder removal can be accomplished by means of the valve 12 in the line 13 joining the chamber 1 and the chamber 6. By varying the opening in the valve 12, the amount of binder vapor capable of moving from the chamber 1 to the chamber 6 can be controlled, thereby also controlling the amount and rate of binder removal. It is also apparent that the valve 12 can be used in combination with variable setting of the temperature within the chamber 6 caused by the cooling coil 7 to control the rate of binder removal.

In a continuous process, the same apparatus as shown would be utilized. However, the valve 12 would serve to cut off the chamber portion 6 from the chamber portion 1. In this way, the chamber 1 can now be heated to sintering temperatures whereupon the green body will be sintered in accordance with the prior art techniques as described in the above noted patents. It should be understood that multiple chambers 1 can be coupled via valves 12 to a single cooling chamber 6 and provide the same results as described hereinabove.

It should be understood that the binder can also be extracted in accordance with the process of my copending application Ser. No. 111,632 filed of even date herewith, now abandoned, wherein the green body 5 is placed on a porous substrate whereby the binder is removed simultaneously with the above described techniques. The advantage of this technique is that the binder will be removed at even more rapid rate than with the above described techniques used alone.

EXAMPLE 1

A green body was formed by injection molding a mixture of nickel powder having particle sizes in the three to five micron diameter range and a paraffin binder having a melting point of approximately 56° C. This green body was formed in accordance with standard prior art techniques. The chamber 1 was then filled with argon gas at a pressure of 1000 lbs. per square inch absolute (PSIA) at a temperature of 450° F. The temperature was raised to 450° F. from ambient room temperature relatively linearly over a period of 8 hours. This temperature was then maintained within the chamber 1. The cooling chamber 6 was maintained at a temperature of approximately 70° F. by means of the cooling coil 7. Condensate started to collect in the region 9 after approximately 2 hours and this condensate continued to collect for 12 hours, whereupon the increase of the quantity of condensate went to zero. The green body 6 was then removed from the pressure chamber 1 and placed in a kiln in an atmosphere of 90% argon and 10% hydrogen at a temperature of 2300° F. which was raised from room temperature over a period of about 6 hours in substantially linear manner. This temperature was maintained for about 1 hour at constant temperature whereupon the heater was turned off. The body was permitted to stay in the kiln until the temperature was reduced therein to proper handling temperatures whereupon the part was removed and found to have high integrity and to be free of cracks and flaws. In addition, the outer surface of the part was found to be of superior quality to those parts produced by the prior art solvent extraction techniques due to the maintenance of the integrity of the outer surface layers of the body.

EXAMPLE 2

The same green body as described in Example 1 was placed in chamber 1 as in Example 1 and the binder was removed in exactly the same manner described with reference to Example 1. After the binder had been removed, the valve 12 was closed to close off the chamber 1 from the chamber 6 and the chamber 1 was then heated to a temperature of 2300° F. in a linear manner from room temperature over a period of four hours and this 2300° F. temperature was maintained for one hour whereupon the heater was turned off. When the green body had decreased in temperature to the point where it could be easily handled, it was removed and found to be of high integrity and free of cracks and flaws. Also, the outer surface thereof was found to be of higher quality than for parts produced by the solvent extraction techniques of the prior art as in Example 1.

EXAMPLE 3

The same green body as described in Example 1 was placed in chamber 1 as in Example 1 except that it was placed on a setter of porous corderite ceramic. The temperature was raised to 70° C. at atmospheric pressure. Binder was observed to flow outwardly from the green body into the porous body by capillarity. After a period of ½ hour the green body was processed as in Example 2. When the green body had decreased in temperature to the point where it could be easily handled, it was removed and found to be of high integrity and free of cracks and flaws. Also, the outer surface thereof was found to be of higher quality than for parts produced by the solvent extraction techniques of the prior art as in Example 1.

EXAMPLE 4

The same green body as described in Example 1 was placed in chamber 1 as in Example 1 except that it was placed on a setter of porous corderite ceramic and that the condensate continued to collect for four hours whereupon the increase in the quantity of condensate went to zero. When the green body had decreased in temperature to the point where it could be easily handled, it was removed and found to be of high integrity and free of cracks and flaws. Also, the outer surface thereof was found to be of higher quality than for parts produced by the solvent extraction techniques of the prior art as in Example 1.

Though the invention has been described with respect to specific preferred embodiments thereof, many variations and modifications will immediately become apparent to those skilled in the art. It is therefore the intention that the appended claims be interpreted as broadly as possible in view of the prior art.

What is claimed is:

1. A method of producing an article in the form of a fired particulate configuration, whereby binder material is removed from the particulate configuration prior to firing without swelling the particulate configuration and consequent imparting of sheer tensile forces to the particulate configuration prior to the firing thereof, comprising the steps of:
   (1) mixing together predetermined amounts of particulate material and binder whereby the binder covers substantially all of the surfaces of the particles of said particulate material;
   (2) forming said mixture from (1) into the desired configuration;

(3) placing said configuration in a pressure chamber and raising the temperature and total pressure throughout said chamber such that the total pressure in said chamber is above the vapor pressure at the ambient temperature within said chamber at the location of said configuration in the chamber of at least a portion of said binder material while maintaining nonequilibrium partial pressure conditions in said chamber with respect to the said portion of said binder, wherein said nonequilibrium conditions comprise maintaining the partial pressure of the binder less than the vapor pressure of the binder at said temperature, to remove said binder material from said configuration; and (4) sintering said stripped and formed mixture from (3).

2. A method as set forth in claim 1 wherein said particulate material is taken from the class consisting of metals, ceramics and cermets.

3. A method as set forth in claim 1 or 2 wherein said binder includes plural components, each component having a different melting point, wherein, in step (3), said pressure is raised above the vapor pressure of the portion of the binder having the lowest melting point until said portion has substantially all flowed out of said configuration, then raising said pressure above the vapor pressure of binder remaining in said configuration.

4. A method as set forth in claim 1 wherein said configuration from (2) is placed in intimate contact with a porous body that is wetted by said binder and chemically inert thereto and both said configuration and said porous body are placed in said pressure chamber.

5. A method as set forth in claim 2 wherein said configuration from (2) is placed in intimate contact with a porous body that is wetted by said binder and chemically inert thereto and both said configuration and said porus body are placed in said pressure chamber.

6. A method as set forth in claim 3 wherein said configuration from (2) is placed in intimate contact with a porous body that is wetted by said binder and chemically inert thereto and both said configuration and said porous body are placed in said pressure chamber.

7. A method as set forth in claim 1 wherein said binder is removed from the atmosphere in said pressure chamber during binder extraction.

8. A method as set forth in claim 2 wherein said binder is removed from the atmosphere in said pressure chamber during binder extraction.

9. A method as set forth in claim 3 wherein said binder is removed from the atmosphere in said pressure chamber during binder extraction.

10. A method as set forth in claim 4 wherein said binder is removed from the atmosphere in said pressure chamber during binder extraction.

11. A method as set forth in claim 1 further including isolating a portion of the atmosphere in said chamber and cooling said isolated portion of said atmosphere.

12. A method as set forth in claim 2 further including isolating a portion of the atmosphere in said chamber and cooling said isolated portion of said atmosphere.

13. A method as set forth in claim 3 further including isolating a portion of the atmosphere in said chamber and cooling said isolated portion of said atmosphere.

14. A method as set forth in claim 4 further including isolating a portion of the atmosphere in said chamber and cooling said isolated portion of said atmosphere.

15. A method as set forth in claim 1 further including, after removal of substantially all of said binder in said pressure chamber in (3), placing a predetermined atmosphere in said pressure chamber and then heating the interior of said chamber to predetermined sintering temperature.

16. A method as set forth in claim 2 further including, after removal of substantially all of said binder in said pressure chamber in (3), placing a predetermined atmosphere in said pressure chamber and then heating the interior of said chamber to predetermined sintering temperature.

17. A method as set forth in claim 3 further including, after removal of substantially all of said binder in said pressure chamber in (3), placing a predetermined atmosphere in said pressure chamber and then heating the interior of said chamber to predetermined sintering temperature.

18. A method as set forth in claim 6 further including, after removal of substantially all of said binder in said pressure chamber in (3), placing a predetermined atmosphere in said pressure chamber and then heating the interior of said chamber to predetermined sintering temperature.

19. A method as set forth in claim 10 further including, after removal of substantially all of said binder in said pressure chamber in (3), placing a predetermined atmosphere in said pressure chamber and then heating the interior of said chamber to predetermined sintering temperature.

20. A method as set forth in claim 14 further including, after removal of substantially all of said binder in said pressure chamber in (3), placing a predetermined atmosphere in said pressure chamber and then heating the interior of said chamber to predetermined sintering temperature.

21. A system for removing binder from a green body on line comprising,
  (1) a pressure chamber,
  (2) a heater positioned within said pressure chamber and controllable externally of said pressure chamber,
  (3) means to apply a predetermined atmosphere and pressure in said pressure chamber, and
  (4) a cooling area coupled to said pressure chamber for cooling a portion of binder released from said green body in said pressure chamber to cause said portion of said binder to condense.

22. A system as set forth in claim 21 further including means for closing off said cooling area from said pressure chamber.

23. A system as set forth in claim 21 further including means to vary to degree of cooling in said cooling area.

24. A system as set forth in claim 22 further including means to vary the degree of cooling in said cooling area.

25. A system as set forth in claim 21 further including means to remove condensed binder from said cooling area.

26. A system as set forth in claim 22 further including means to remove condensed binder from said cooling area.

27. A system as set forth in claim 23 further including means to remove condensed binder from said cooling area.

28. A system as set forth in claim 24 further including means to remove condensed binder from said cooling area.

29. The product of the process of claim 1.

30. The product of the process of claim 2.
31. The product of the process of claim 3.
32. The rpoduct of the process of claim 6.
33. The product of the process of claim 10.
34. The product of the process of claim 11.
35. The product of the process of claim 14.
36. The product of the process of claim 15.
37. The product of the process of claim 20.

* * * * *